United States Patent
Gosling et al.

(10) Patent No.: US 11,371,868 B2
(45) Date of Patent: Jun. 28, 2022

(54) CONDUCTIVE POLYMER REFERENCE CONNECTION FOR MAGNETIC FLOWMETER

(71) Applicant: Micro Motion Inc., Boulder, CO (US)

(72) Inventors: Arthur S. Gosling, Minneapolis, MN (US); Chad T. Weigelt, Minneapolis, MN (US); Samuel E. Messenger, Chaska, MN (US); Erik D. Anderson, Chanhassen, MN (US)

(73) Assignee: Micro Motion, Inc., Boulder, CO (US)

( * ) Notice: Subject to any disclaimer, the term of this patent is extended or adjusted under 35 U.S.C. 154(b) by 450 days.

(21) Appl. No.: 15/692,741

(22) Filed: Aug. 31, 2017

(65) Prior Publication Data

US 2019/0063969 A1   Feb. 28, 2019

(51) Int. Cl.
| | |
|---|---|
| *G01F 1/60* | (2006.01) |
| *G01F 1/58* | (2006.01) |
| *H01B 1/12* | (2006.01) |
| *C08L 27/12* | (2006.01) |
| *C08K 3/04* | (2006.01) |
| *C09D 127/18* | (2006.01) |

(52) U.S. Cl.
CPC ............ *G01F 1/60* (2013.01); *C08K 3/04* (2013.01); *C08L 27/12* (2013.01); *C09D 127/18* (2013.01); *G01F 1/586* (2013.01); *G01F 1/588* (2013.01); *H01B 1/124* (2013.01)

(58) Field of Classification Search
CPC . G01F 1/586; G01F 1/588; G01F 1/60; C08K 3/04; C08L 27/12; C09D 127/18; H01B 1/124
See application file for complete search history.

(56) References Cited

U.S. PATENT DOCUMENTS

| | | | | |
|---|---|---|---|---|
| 2,757,538 | A * | 8/1956 | Soffel | ............... G01F 1/58 73/861.16 |
| 6,325,390 | B1 * | 12/2001 | Sillmon | ............... F16L 23/003 277/614 |
| 6,367,803 | B1 * | 4/2002 | Loth | ............... F16L 23/18 277/321 |

(Continued)

FOREIGN PATENT DOCUMENTS

| | | |
|---|---|---|
| JP | H05-157600 A | 6/1993 |
| JP | H06-008501 U | 3/1994 |

(Continued)

OTHER PUBLICATIONS

International Search Report and Written Opinion, dated Dec. 4, 2018, for International Patent Application No. PCT/US2018/047515, 15 pages.

(Continued)

*Primary Examiner* — Justin N Olamit
(74) *Attorney, Agent, or Firm* — Christopher R. Christenson; Kelly, Holt & Christenson PLLC

(57) ABSTRACT

An electromagnetic flowmeter assembly is provided. The assembly includes a magnetic flowmeter configured to couple to a process pipe at a coupling point and measure a flowrate of a flow of process fluid. The assembly includes a conductive polymer reference connection configured to contact the process fluid and provide an electrical connection to magnetic flowmeter electronics.

1 Claim, 6 Drawing Sheets

(56) References Cited

U.S. PATENT DOCUMENTS

| | | | |
|---|---|---|---|
| 7,412,901 B2* | 8/2008 | Baecker | G01F 1/58 |
| | | | 73/861.12 |
| 9,068,869 B2* | 6/2015 | Smith | G01F 1/584 |
| 9,410,910 B1 | 8/2016 | Fourgere | |
| 2012/0118073 A1* | 5/2012 | Kerrom | G01F 1/584 |
| | | | 73/861.08 |

FOREIGN PATENT DOCUMENTS

| | | |
|---|---|---|
| JP | H06-009320 U | 3/1994 |
| JP | 2004-354167 A | 12/2004 |
| KR | 101518838 B1 * | 5/2015 |

OTHER PUBLICATIONS

First Office Action for Chinese Patent Application No. 201711135084. X, dated Feb. 3, 2020, 16 pages including English translation.

First Examination Report for Indian Patent Application No. 20207006034, dated Jun. 30, 2021, 4 pages including English translation.

Rejection Decision for Japanese Patent Application No. 2020-512444, dated Jul. 13, 2021, 9 pages including English translation.

European Search Report dated May 12, 2021 for European Patent Application No. 18849489.2, 7 pages.

Chinese Rejection Decision dated Apr. 12, 2021 for Chinese Patent Application No. 201711135084.X, 14 pages including English Translation.

Japanese Office Action dated Mar. 2, 2021 for Japanese Patent Application No. 2020-512444, 18 pages including English translation.

* cited by examiner

CONDUCTIVE POLYMER REFERENCE CONNECTION FOR MAGNETIC FLOWMETER

BACKGROUND

Magnetic flowmeters (or mag meters) measure flow by Faraday induction, an electromagnetic effect. The magnetic flowmeter energizes one or more coils which generate a magnetic field across a section of a flowtube assembly. The magnetic field induces an electromotive force (EMF) across the flow of conductive process fluid through the flowtube assembly. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross sectional area of the flowtube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flowmeters are often employed in the hydrocarbon fuel industry, which sometimes employs hydraulic fracturing techniques utilizing abrasive and corrosive slurries.

Additionally, magnetic flowmeters can be specified with a variety of different lining and/or electrode materials to suit the application for which the magnetic flowmeter is employed. Examples of lining materials include polytetrafluoroethylene (PTFE); ethylene tetrafluoroethylene (ETFE); PFA; polyurethane; neoprene; and linatex rubber, as well as other materials. Further, electrodes may be constructed from any suitable material including 316 L stainless steel; nickel alloy 276; tantalum; platinum/iridium blends; titanium; as well as other suitable materials.

SUMMARY

An electromagnetic flowmeter assembly is provided. The assembly includes a magnetic flowmeter configured to couple to a process pipe at a coupling point and measure a flowrate of a flow of process fluid. The assembly includes a conductive polymer reference connection configured to contact the process fluid and provide an electrical connection to magnetic flowmeter electronics.

DETAILED DESCRIPTION OF ILLUSTRATIVE EMBODIMENTS

During operation of a magnetic flowmeter, it is often required to have a robust electrical connection to the process fluid itself resulting from the use of a liner. Once established, the connection can be used as a reference for the measurement circuitry of the magnetic flowmeter, which, in turn, leads to an improved signal quality, better electromagnetic immunity, and further measurements of the flow signal and process.

Currently, a connection to the process fluid itself is achieved through the use of a metal ring or a grounding electrode that comes into contact with the process fluid. However, several problems arise from the use of a metal ring or a grounding electrode. For example, process fluid may often be corrosive or require other process compatibility (e.g. chemical compatibility), necessitating that the metal ring or the grounding electrode be able to withstand a wide variety of process conditions. Additionally, the metal ring or the grounding electrode need to provide a low resistance connection to the measurement circuitry of the magnetic flowmeter. As a result, the metal ring or the grounding electrode must often consist of exotic metals which can include tantalum, platinum, Monel™ from Special Metals Corporation and Hastelloy™ from Haynes International, Inc. However, by using a metal ring consisting of exotic metals, costs often increase.

An exotic metal ring is often placed at a connection point between the flowmeter and a pipe, which are connected by fastening a pipe flange to a corresponding flange of the magnetic flowmeter. However, in order to ensure a secure connection is maintained, a gasket is required on both sides of the exotic metal ring. In turn, this leads to an increased likelihood that process fluid will leak from the connection point. Additionally, a grounding electrode made from these exotic metals is often subjected to process coating and conductivity limitations due to a relatively small surface area that contacts the process fluid.

In accordance with an embodiment of the present invention, a thermally-stable, chemically-compatible, relatively less expensive conductive polymer reference connection is provided that has a sufficiently large process contact area, and allows for a low impedance path to the measurement circuitry of a magnetic flowmeter. Additionally, besides allowing for reference measurements, the conductive polymer reference connection also simultaneously serves as a gasket, therein eliminating several potential leak paths at a coupling point between the magnetic flowmeter and a process pipe.

Figure 1:
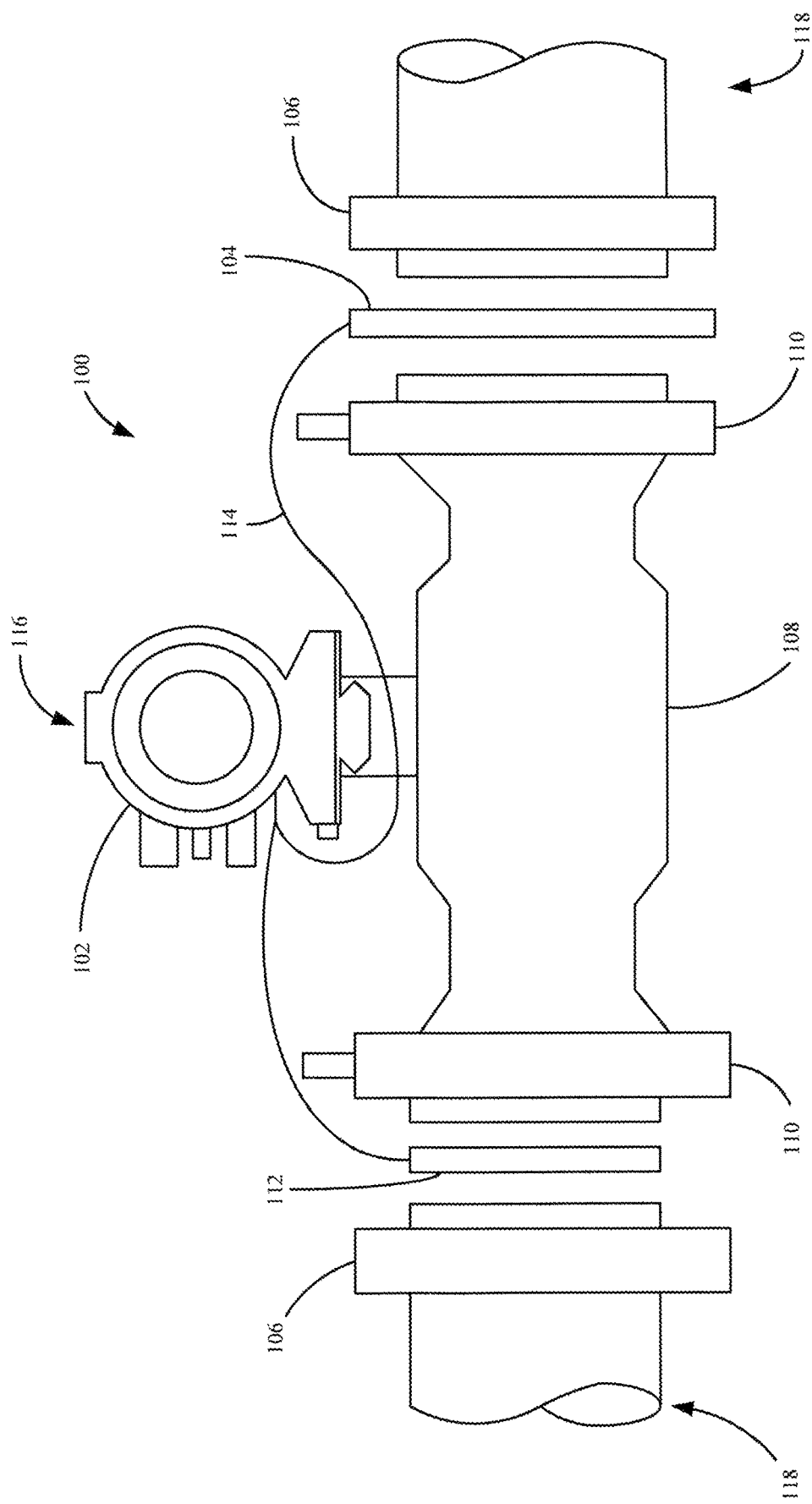
FIG. 1 is a diagrammatic view of an electromagnetic flowmeter assembly in accordance with an embodiment of the present invention.

FIG. 1 is a diagrammatic view of an electromagnetic flowmeter assembly in accordance with an embodiment of the present invention. Electromagnetic flowmeter assembly 100 includes a magnetic flowmeter 116, process piping 118 and conductive polymer reference connections 112 and 104. Process piping 118 is configured to receive a flow of process fluid and couple to magnetic flowmeter 116. In one embodiment, process piping 118 is coupled to magnetic flowmeter 116 at a coupling point between process flanges 106 of process piping 118 and flowtube flanges 110 of magnetic flowmeter 116. For example, a bolted connection may be used between process flanges 106 and flowtube flanges 110 to securely fasten process piping 118 to magnetic flowmeter 116. Magnetic flowmeter 116 includes an electronics housing 102 and a flowtube assembly 108 which includes a tube 206, EMF sensors 204 and coils 202, as will be discussed in FIG. 2. In operation, magnetic flowmeter 116 is configured to receive the flow of process fluid from process piping 118 and measure a process fluid flowrate using an application of Faraday's Law of Magnetic Induction, which is shown by the relationship:

$$E=k*B*D*V \qquad \text{[Equation 1]}$$

Where E is induced voltage (linear with velocity), k is a proportionality constant, B is magnetic field strength (coil inductance), D is distance between electrodes and V is velocity of process fluid.

Conductive polymer reference connections 112 and 104 are electrically connected to electronics housing 102 of magnetic flowmeter 116 using conductive wires 114. Conductive polymer reference connections 112 and 104 are configured to contact the flow of process fluid and provide a reference to measurement circuitry within electronics housing 102. In one embodiment, conductive polymer reference connections 112 and 104 are disposed at a coupling point between process piping 118 and magnetic flowmeter 116. Additionally, conductive polymer reference connections 112 and 104 may also serve as gaskets between process piping 118 and magnetic flowmeter 116. In this embodiment, when process flanges 106 are coupled to flowtube flanges 110, conductive polymer reference connections 112 provide a robust seal between process piping 118 and magnetic flowmeter 116 such that process fluid does not leak from the coupling point. Additionally, conductive polymer reference connections 112 and 104 are also non-intrusive so that an internal leak path is not present at the coupling point. Further, while two conductive polymer reference connections 112 and 104 are illustratively shown, it is expressly contemplated that only one conductive polymer reference connection may be used in accordance with an embodiment of the present invention.

As illustratively shown in FIG. 1, conductive polymer reference connections 112 and 104 may have different size dimensions, however, it is also expressly contemplated that they may be identical in some embodiments. Further, as will be discussed in FIG. 3, conductive polymer reference connections 112 and 104 may comprise different conductive polymers, or, be manufactured using a variety of different processes. Additionally, in one embodiment, conductive polymer reference connections 112 and 104 serve as self-aligning aids to avoid disrupting a flow of process fluid as it passes through a magnetic flowmeter.

In one embodiment, grounding electrodes over-molded with a conductive polymer may also be used in addition to, or separate from, conductive polymer reference connections 112 and 104. In this embodiment, grounding electrodes within flowtube assembly 108 provide a process reference to measurement circuitry within electronics housing 102. By having grounding electrodes over-molded with a conductive polymer, this would further limit the need for exotic metals.

In another embodiment, conductive polymer reference connections 112 and 104 may include a conductive polymer section molded into a liner of a magnetic flowmeter. In this example, the molded conductive polymer section within the liner may provide a reference connection to magnetic flowmeter electronics.

Figure 2:
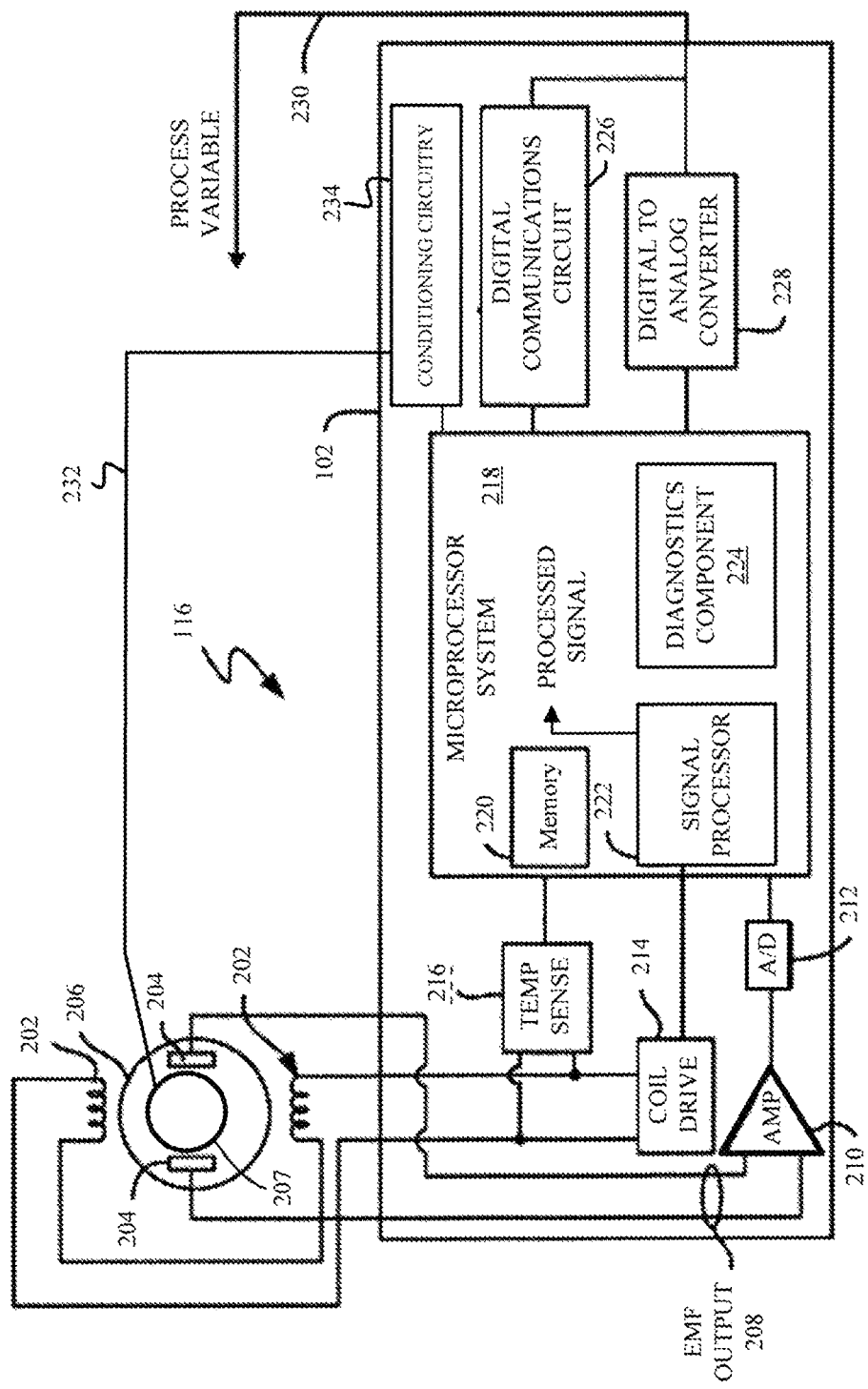
FIG. 2 is a block diagram of an electromagnetic flowmeter assembly in accordance with an embodiment of the present invention.

FIG. 2 is a block diagram of a magnetic flowmeter with which embodiments of the present invention are particularly useful. Magnetic flowmeter 116 includes a flowtube assembly, e.g. reference numeral 108 in FIG. 1, that includes a tube 206, coils 202 and electrodes 204 within the flowtube assembly. In operation, tube 206 receives a flow of process fluid from a process pipe, such as process piping 118 in FIG. 1. Coils 202 apply an external magnetic field through the flow of process fluid within tube 206 in response to an applied drive current from coil drive circuitry 214. An induced voltage is then created within the flow of process fluid and is detectable by electrodes 204. Based on the induced voltage, an EMF output 208 is generated and provided to measurement circuitry, which includes an amplifier 210 and an analog to digital converter 212.

Magnetic flowmeter 116 also includes electronics housing 102 that includes coil drive circuitry 214, temperature sensor circuitry 216, measurement circuitry that includes amplifier 210 and analog to digital converter 212, microprocessor system 218, digital communications circuit 226 and digital to analog converter 228. In operation, amplifier 210 receives EMF output 208 from electrodes 204 and amplifies the signal using known methods. An amplified EMF output is then provided to analog to digital converter 212 so that a digitized EMF signal can be provided to microprocessor system 218. In one embodiment, microprocessor system 218 includes a memory 220, a signal processor 222 and a diagnostic component 224. Microprocessor system 218 receives the digitized EMF signal and generates a flowrate based on the received digitized EMF signal.

Additionally, as illustratively shown, magnetic flowmeter 116 is coupled to a conductive polymer reference connection 207 configured to couple to electronics within electronics housing 102. In one embodiment, conductive polymer reference connection 207 is configured to couple to electronics housing 102 via a conductive wire 232 and provide a reference measurement from the flow of process fluid. For example, in one embodiment, a reference measurement can be provided to conditioning circuitry 234 within electronics housing 102 which may include amplifier circuitry, an analog-to-digital converter, linearization circuitry, or any other conditioning circuitry. A conditioned reference measurement may then be provided to microprocessor system 218. In turn, this may lead to an improved signal quality and electromagnetic immunity. However, in another embodiment, it is expressly contemplated that a reference measurement may be provided to amplifier 210 and analog to digital converter 212 prior to microprocessor system 218.

In one embodiment, electronics housing 102 communicates the flowrate over a communication bus 230 using digital communications circuit 226 and digital to analog converter 228. In a typical processing plant, communication bus 230 can be a 4-20 mA current loop, a FOUNDATION™ Fieldbus segment, a pulse output/frequency output, a Highway Addressable Remote Transducer (HART®) protocol communication, a wireless communication connection, such as that in accordance with IEC 62591, Ethernet, or a fiber optic connection to a controller such as a system controller/monitor, or any other suitable device.

Figure 3:
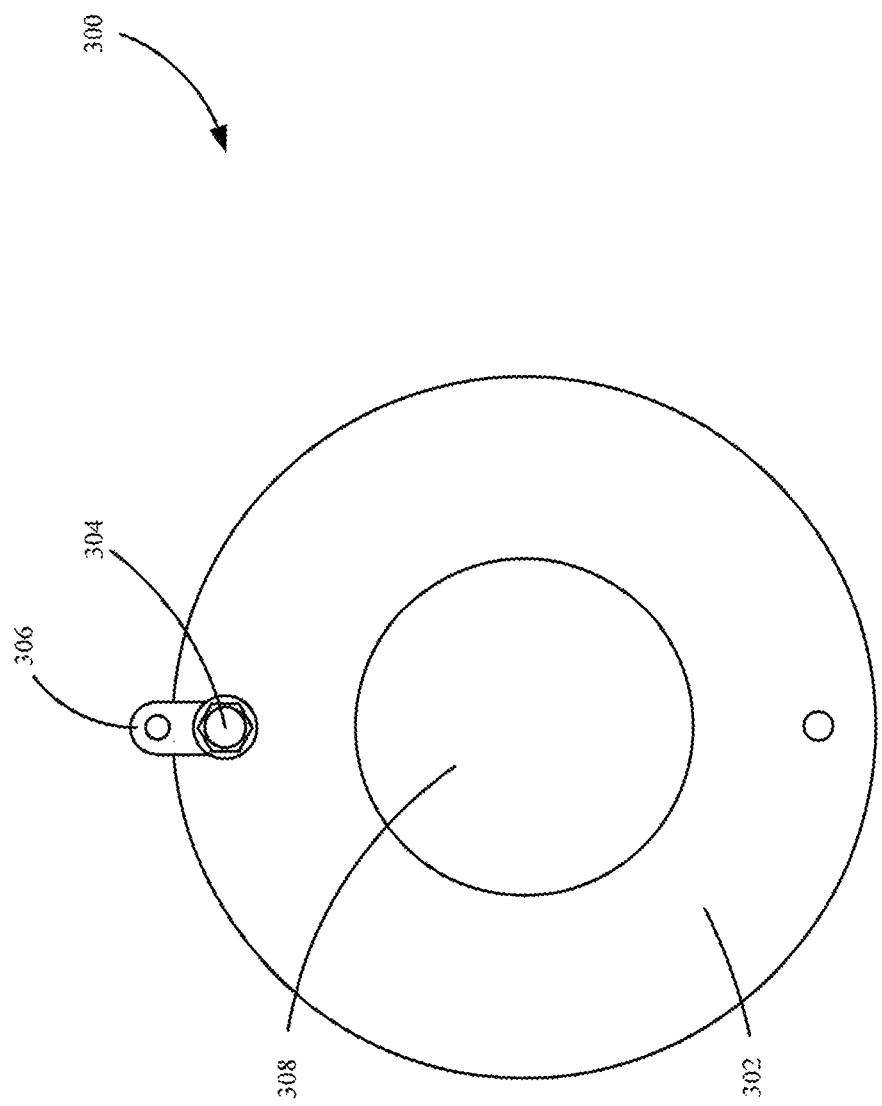
FIG. 3 is a diagrammatic view of a conductive polymer reference connection in accordance with an embodiment of the present invention.

FIG. 3 is a diagrammatic view of a conductive polymer reference connection in accordance with an embodiment of the present invention. Conductive polymer reference connection 300 includes a body 302, a central aperture 308, a fastening mechanism 304 and a tab 306. Conductive polymer reference connection 300 is configured to be disposed between a magnetic flowmeter and a process pipe at a coupling point, as illustratively shown in FIG. 1 in regards to conductive polymer reference connections 112 and 104. However, it is expressly contemplated that conductive polymer reference connection 300 is disposed at another point along a process pipe or a magnetic flowmeter. Conductive polymer reference connection 300 is configured to provide a process reference to measurement circuitry of a magnetic flowmeter while simultaneously serving as a gasket between the magnetic flowmeter and the process pipe.

Body 302 of conductive polymer reference connection 300, in accordance with an embodiment of the present invention, is formed of a conductive polymer. This may include conductive carbon black compounded perfluoroalkoxy (PFA), acrylonitrile butadiene styrene (ABS), polytetrafluoroethylene (PTFE), ethylene tetrafluoroethylene (ETFE), polyurethane, neoprene, etc. In one embodiment, body 302 is formed of 5 percent conductive carbon black compounded perfluoroalkoxy (PFA). However, other concentrations of carbon black can be used in accordance with embodiments of the present invention. Body 302 may be formed of an over-molded metal ring with a conductive polymer. In another example, body 302 may be a press-fit metal ring with a conductive polymer. Alternatively, body 302 may be substantially made of a conductive polymer. As such, it is expressly contemplated that body 302 can be made into a variety of shapes and sizes in accordance with an embodiment of the present invention.

As illustratively shown in FIG. 1, body 302 of conductive polymer reference connection 300 can vary in size. In one embodiment, body 302 has a larger diameter than that of a process pipe, as illustratively shown by conductive polymer reference connection 104 in FIG. 1. Alternatively, body 302 may have a diameter substantially equal to that of a diameter of a process pipe, as illustratively shown by conductive polymer reference connection 112 in FIG. 1. Additionally, conductive polymer reference connection 300 can take a variety of shapes as will be discussed later.

In a preferred embodiment, conductive polymer ground reference connection 300 is non-intrusive when coupled to a process pipe and a magnetic flowmeter while having an enlarged surface area. In this embodiment, there is no internal leak path at the coupling point between the process pipe and the magnetic flowmeter or, a flow path that a process fluid could attack non-wetted materials and disable the magnetic flowmeter. Further, since process fluid can be highly corrosive and have an elevated temperature, it is also important that body 302 be able to withstand a variety of process conditions as conductive polymer reference connection 300 comes into contact with the process fluid. Therefore, in one embodiment, conductive polymer reference connection 300 also has a higher working temperature compared to a temperature of process fluid, and, simultaneously, is chemically-compatible with process fluid such that conductive polymer reference connection 300 does not erode when in the presence of the process fluid. Additionally, conductive polymer reference connection 300 also provides a low resistance connection to the measurement circuitry of the magnetic flowmeter.

At the center of body 302 is a central aperture 308 designed to come into contact with process fluid and serve as a passageway of fluid between a process pipe and a magnetic flowmeter. In one example, central aperture 308 has a reduced diameter relative to a diameter of the process pipe, reducing a line size between a process pipe and a magnetic flowmeter. By having central aperture 308 vary in diameter relative to a process pipe, a rate of process fluid entering a magnetic flowmeter can be controlled.

In one embodiment, conductive polymer reference connection 300 includes fastening mechanism 304 configured to couple tab 306 to body 302 of conductive polymer reference connection 300. Tab 306 is configured to attach to a wire, e.g. conductive wire 114 in FIG. 1, and allow electronics housing 102 to receive a process reference. Fastening mechanism 304 may include a machine screw and a nut. However, a variety of fastening mechanisms 304 may be used in accordance with an embodiment of the present invention.

Figure 4:
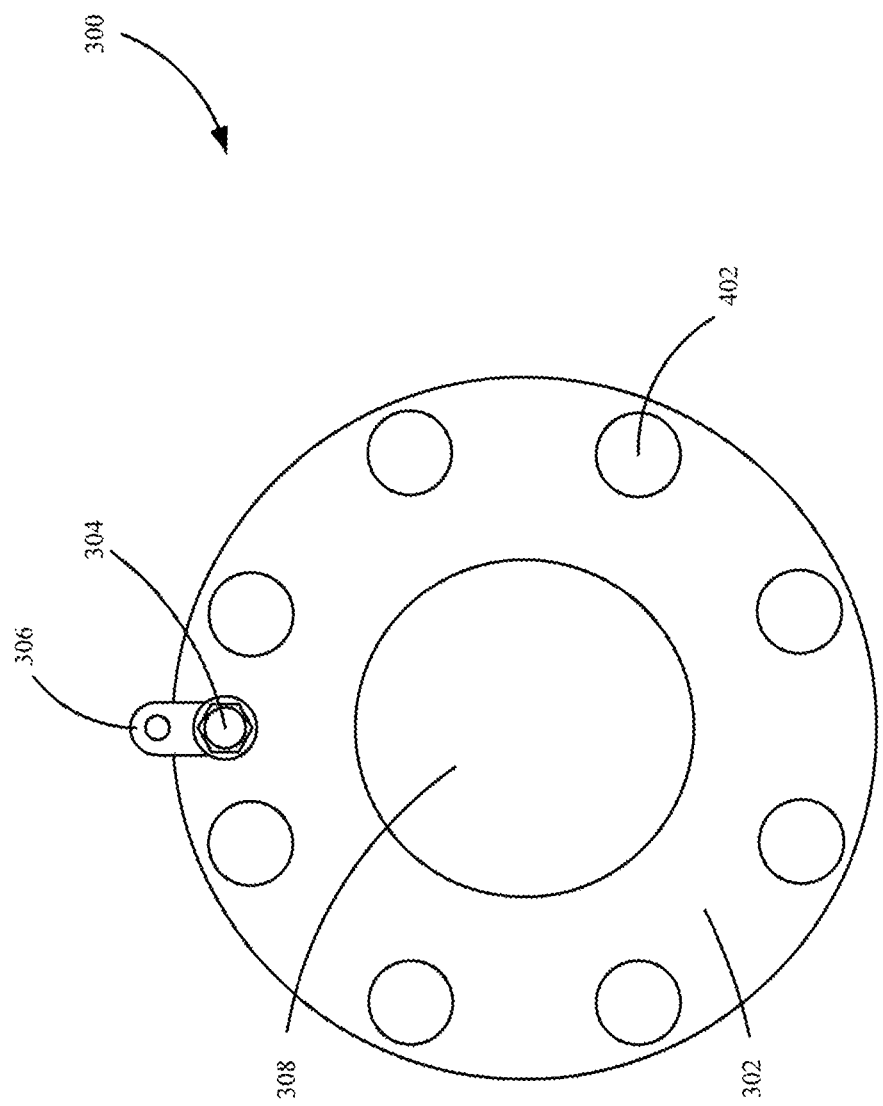
FIG. 4 is another diagrammatic view of a conductive polymer reference connection in accordance with an embodiment of the present invention.

When body 302 has a larger diameter than a diameter of a process pipe, as illustratively shown by conductive polymer ground reference connection 104 in FIG. 1, it may be necessary that conductive polymer reference connection 300 have a plurality of radial apertures 402 as illustratively shown in FIG. 4. For example, if a bolted connection is used to couple a process flange, e.g. reference numeral 106 in FIG. 1, to a flowtube flange, e.g. reference numeral 110 in FIG. 1, a plurality of bolts may need to pass through conductive polymer reference connection 300 in order to couple the flange of the process pipe to the flange of the magnetic flowmeter.

Figure 5:
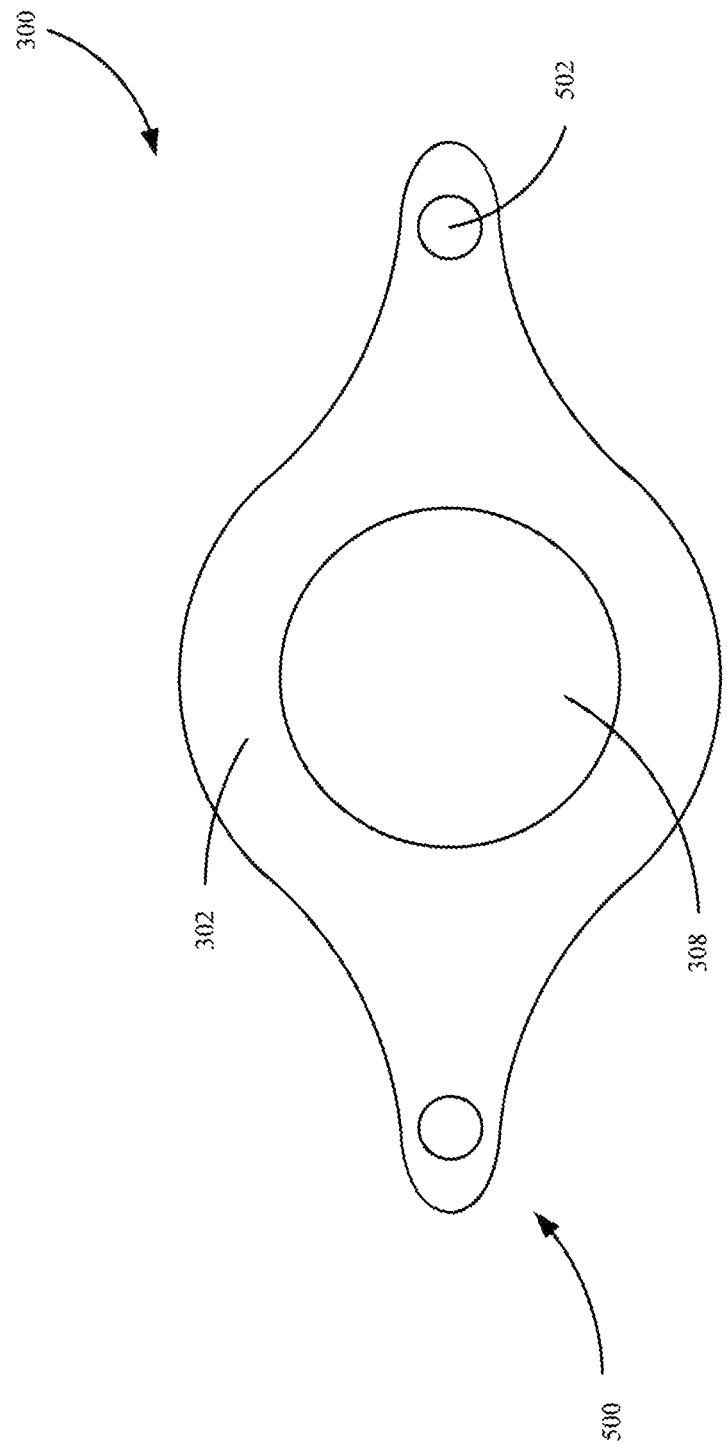
FIG. 5 is another diagrammatic view of a conductive polymer reference connection in accordance with an embodiment of the present invention.

Additionally, conductive polymer ground reference connection 300 may include a variety of shapes depending on the size of a magnetic flowmeter and corresponding process piping. For example, as illustratively shown in FIG. 5, conductive polymer reference connection 300 may include body 302 having end portions 500 with apertures 502 configured to couple conductive polymer reference connection 300 to a magnetic flowmeter. For example, in fractional magnetic flowmeters, or, magnetic flowmeters having less than a one inch line size, it may be necessary to have a conductive polymer reference connection 300 with end portions 500. However, in accordance with the present invention, any size and shape of a conductive polymer ground reference connection may be used.

Figure 6:
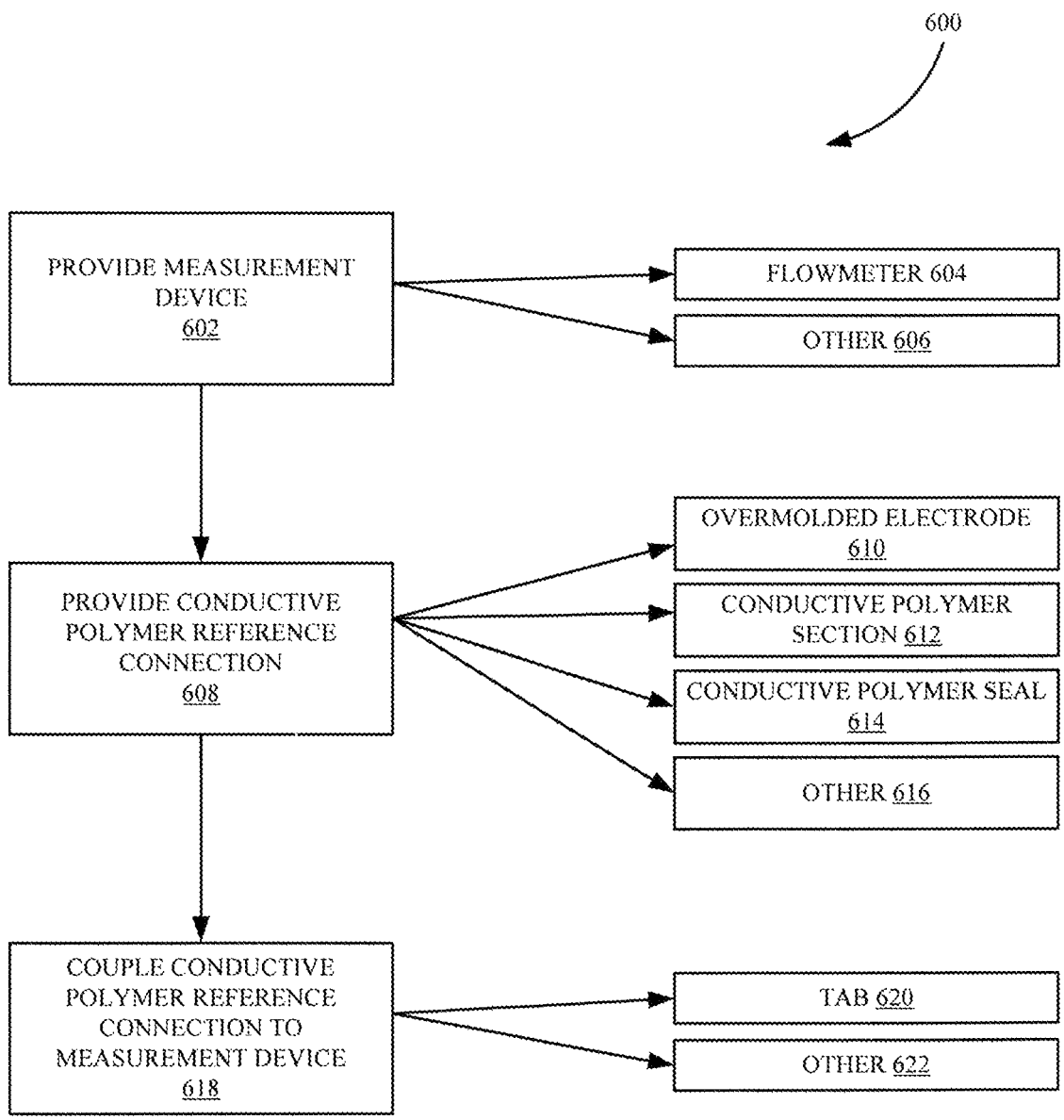
FIG. 6 is a flow diagram of a method of assembling a measurement device assembly in accordance with an embodiment of the present invention.

FIG. 6 is a flow diagram of a method of assembling a measurement device assembly in accordance with an embodiment of the present invention. Method 600 begins at block 602 where a measurement device is provided. In one embodiment, the measurement device is a flowmeter as indicated in block 604. However, other measurement devices may be used in accordance with embodiments of the present invention as indicated in block 606.

A conductive polymer reference connection is then provided as indicated in block 608. In accordance with an embodiment of the present invention, the conductive polymer reference connection is configured to provide a reference measurement to electronic circuitry of a measurement device. In one embodiment, this includes providing an electrode over-molded with a conductive polymer as indicated in block 610. In another embodiment, this includes providing a conductive polymer section within a liner as indicated in block 612. Additionally, this may include providing a conductive polymer seal between a process pipe and a measurement device as indicated in block 614. However, it is to be understood that a wide variety of other conductive polymer reference connections can be provided as indicated in block 616.

Next, at block 618, a conductive polymer reference connection is coupled to a measurement device. In one embodiment, this includes a wired connection between a tab of the conductive polymer reference connection and electronics of a measurement device, as indicated in block 620. However, other connections can be used as well to connect the conductive polymer reference connection to the electronics of the measurement device, as indicated in block 622.

Although the present invention has been described with reference to preferred embodiments, workers skilled in the art will recognize that changes may be made in form and detail without departing from the spirit and scope of the invention.

What is claimed is:

1. An electromagnetic flowmeter assembly comprising:
 a magnetic flowmeter configured to couple to a process pipe at a coupling point and measure a flowrate of a flow of process fluid, the magnetic flowmeter having flowmeter electronics, a liner, and a pair of electrodes coupled to the flowmeter electronics and being disposed to measure an electrical characteristic of the process fluid flowing through the liner;
 a conductive polymer reference connection spaced from the pair of electrodes and configured to contact the process fluid, the conductive polymer reference connection being coupled to the flowmeter electronics;
 wherein the conductive polymer reference connection comprises a conductive polymer section molded into the liner of the magnetic flowmeter; and
 wherein the conductive polymer reference connection comprises a ring and wherein the conductive polymer reference connection comprises a central aperture configured to reduce a line size between the process pipe and the magnetic flowmeter.

* * * * *